US010909177B1

(12) United States Patent
Rudish et al.

(10) Patent No.: US 10,909,177 B1
(45) Date of Patent: Feb. 2, 2021

(54) PERCENTILE DETERMINATION SYSTEM

(71) Applicant: Workday, Inc., Pleasanton, CA (US)

(72) Inventors: Don Rudish, Mountain House, CA (US); Muthu Jayakumar, San Ramon, CA (US); Patrick Kirby, Livermore, CA (US)

(73) Assignee: Workday, Inc., Pleasanton, CA (US)

( * ) Notice: Subject to any disclaimer, the term of this patent is extended or adjusted under 35 U.S.C. 154(b) by 985 days.

(21) Appl. No.: 15/408,266

(22) Filed: Jan. 17, 2017

(51) Int. Cl.
*G06F 16/00* (2019.01)
*G06F 16/901* (2019.01)
*H04L 12/24* (2006.01)
*G06F 16/30* (2019.01)

(52) U.S. Cl.
CPC .......... *G06F 16/901* (2019.01); *H04L 41/142* (2013.01)

(58) Field of Classification Search
None
See application file for complete search history.

(56) References Cited

U.S. PATENT DOCUMENTS

| | | | | |
|---|---|---|---|---|
| 5,458,117 | A * | 10/1995 | Chamoun | A61B 5/048 600/547 |
| 5,960,435 | A * | 9/1999 | Rathmann | G06F 16/258 |
| 6,434,570 | B1 * | 8/2002 | Rangan | G06F 17/18 |
| 6,941,287 | B1 * | 9/2005 | Vaidyanathan | G06K 9/6229 706/12 |
| 7,590,620 | B1 * | 9/2009 | Pike | G06F 11/1482 |
| 8,024,458 | B1 * | 9/2011 | Buragohain | G06F 11/3495 709/224 |
| 8,868,573 | B2 * | 10/2014 | Chu | G06F 16/27 707/752 |
| 9,210,056 | B1 * | 12/2015 | Choudhary | G06F 16/284 |
| 9,697,316 | B1 | 7/2017 | Taylor | |
| 10,282,874 | B2 * | 5/2019 | Schlossnagle | G06K 9/4642 |
| 2003/0033403 | A1 * | 2/2003 | Rhodes | H04L 43/02 709/224 |
| 2004/0024801 | A1 * | 2/2004 | Hamilton | G06F 17/18 708/490 |
| 2005/0137494 | A1 * | 6/2005 | Viertio-Oja | A61B 5/7203 600/544 |
| 2007/0090178 | A1 | 4/2007 | Fujii | |
| 2008/0011569 | A1 | 1/2008 | Hillier | |
| 2009/0313635 | A1 * | 12/2009 | Dasdan | G06F 9/5083 718/105 |
| 2010/0279622 | A1 | 11/2010 | Shuman | |
| 2010/0290346 | A1 | 11/2010 | Barford | |
| 2011/0261049 | A1 * | 10/2011 | Cardno | G06Q 10/10 345/419 |
| 2013/0054426 | A1 | 2/2013 | Rowland | |
| 2013/0085803 | A1 | 4/2013 | Mauro | |
| 2013/0218909 | A1 * | 8/2013 | Chu | G06Q 10/10 707/752 |
| 2014/0096146 | A1 * | 4/2014 | Maor et al. | G06F 17/18 708/490 |
| 2015/0120907 | A1 | 4/2015 | Niestemski | |

(Continued)

*Primary Examiner* — Polina G Peach
(74) *Attorney, Agent, or Firm* — Van Pelt, Yi & James LLP

(57) ABSTRACT

A system for determining percentiles includes an interface and a processor. The interface is configured to receive a request to determine a percentile value. The processor is configured to determine relevant data based at least in part on the request, determine an ordered data list map, determine the percentile value based at least in part on the ordered data list map, and provide the percentile value.

22 Claims, 12 Drawing Sheets

(56) References Cited

U.S. PATENT DOCUMENTS

| | | | |
|---|---|---|---|
| 2015/0213631 A1* | 7/2015 | Vander Broek | G06T 11/206 345/589 |
| 2015/0215700 A1* | 7/2015 | Sun | H04R 3/002 381/94.2 |
| 2016/0019595 A1 | 1/2016 | Wu | |
| 2016/0078654 A1* | 3/2016 | Schlossnagle | G06F 16/2477 345/440.2 |
| 2016/0179874 A1* | 6/2016 | Lynch | G06F 16/2379 707/690 |
| 2016/0306923 A1* | 10/2016 | van Rooyen | G06N 3/002 |
| 2017/0367620 A1* | 12/2017 | Orr | A61B 5/0836 |
| 2018/0068005 A1 | 3/2018 | Vemuri | |
| 2018/0081629 A1* | 3/2018 | Kuhhirte | G06F 7/24 |
| 2018/0121856 A1 | 5/2018 | Song | |
| 2018/0166265 A1* | 6/2018 | Geromanos | G01N 30/8675 |

* cited by examiner

Raw Data

| 6 | 1 | 2 | 8 | 10 | 8 | 7 | 4 | 9 | 3 |
|---|---|---|---|---|---|---|---|---|---|
| 4 | 3 | 10 | 4 | 7 | 5 | 10 | 5 | 4 | 4 |
| 10 | 9 | 1 | 10 | 1 | 9 | 10 | 2 | 9 | 10 |
| 5 | 8 | 4 | 8 | 2 | 7 | 1 | 5 | 6 | 10 |
| 2 | 7 | 4 | 3 | 6 | 6 | 8 | 3 | 4 | 10 |

Data Histogram

User Interface Panel

Percentile to Calculate: 35

Value: 4

PERCENTILE DETERMINATION SYSTEM

BACKGROUND OF THE INVENTION

A large company tracking information on its network systems, users, etc., can create large volumes of data very rapidly, e.g., upwards of 1 TB/day. The data is only useful to the company if it can be analyzed. Some desired data analysis steps can be precomputed and do not need to be performed in real time (e.g., in response to a user request, while the user is waiting for the response), however for some this is not possible. Data analysis may be desired on different subsets of data in order to get a better picture, e.g., data taken on certain days, at certain times, for certain users, etc. Too many different possible subsets exist to precompute data analysis for all of them, creating a problem where data analysis steps must be efficient enough to execute in real time on very large data sets. In addition, in some cases real-time analysis is critical as corrective action(s) cannot be taken without real-time information.

BRIEF DESCRIPTION OF THE DRAWINGS

Various embodiments of the invention are disclosed in the following detailed description and the accompanying drawings.

DETAILED DESCRIPTION

Figure 1:
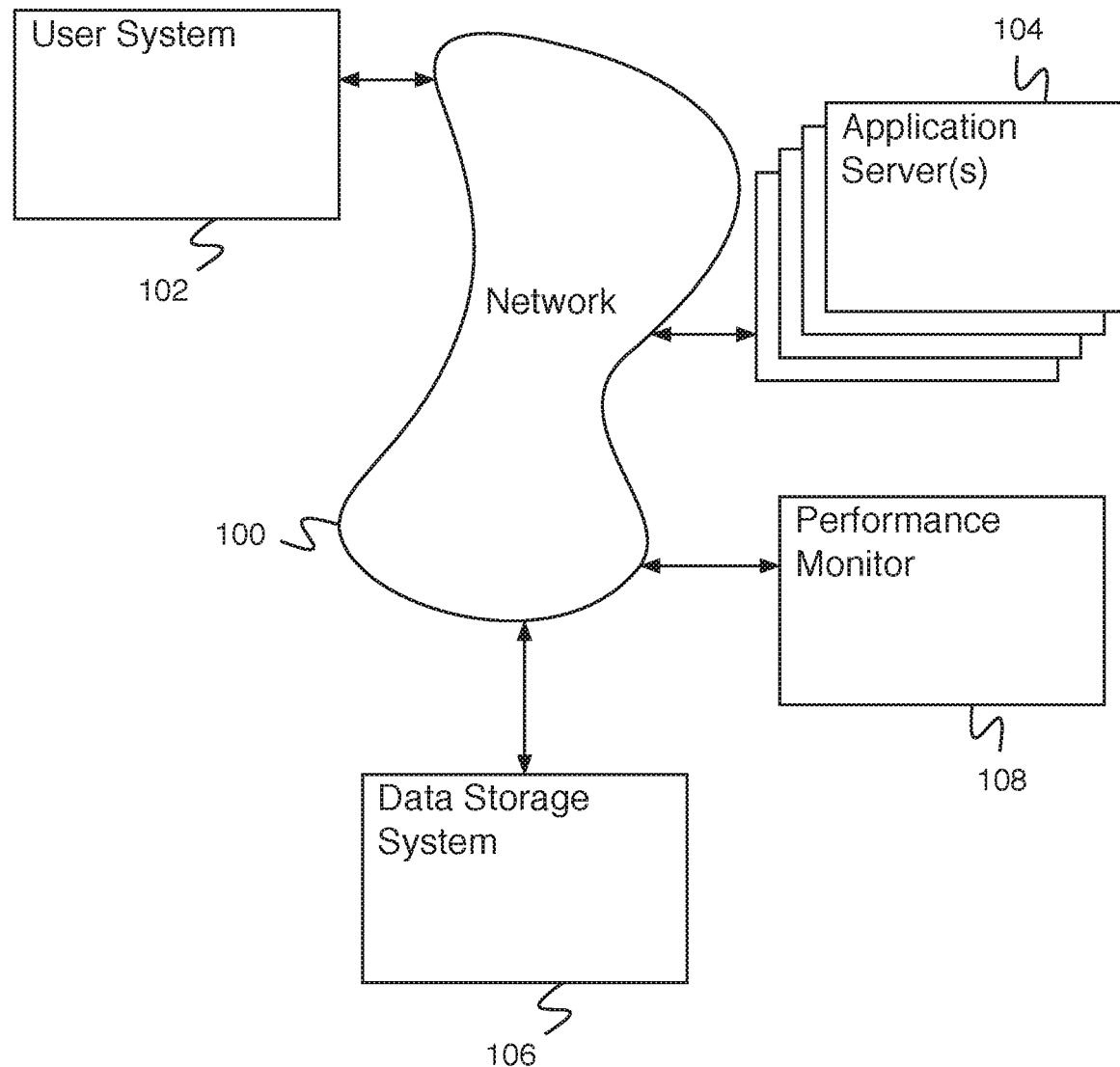
FIG. 1 is a block diagram illustrating an embodiment of a network system comprising an application server and a data storage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining percentiles is disclosed. The system comprises an interface and a processor. The interface is configured to receive a request to determine a percentile value. The processor is configured to determine relevant data based at least in part on the request, determine an ordered data list map, determine the percentile value based at least in part on the ordered data list map, and provide the percentile value. In some embodiments, the system for determining percentiles comprises a memory coupled to the processor and configured to provide the processor with instructions.

In some embodiments, a system for determining percentiles for a performance data comprises an interface configured to receive a request to determine a percentile value for the performance data and a processor configured to determine relevant data based at least in part on the request, determine an ordered data list map, determine the percentile value based at least in part on the ordered data list map, and provide the percentile value for the performance data. In some embodiments, the system for determining percentiles comprises a memory coupled to the processor and configured to provide the processor with instructions.

In some embodiments, a system for determining percentiles comprises a system for determining percentiles efficiently on data sets. The system for determining percentiles computes percentiles efficiently by first reducing the data set size by computing a data list map for the data (e.g., by transforming multiple same valued data points into a single data point with an associated frequency). The system for determining percentiles computes percentiles efficiently by further reducing the data set size by grouping similar values (e.g., by transforming a set of similarly valued data points with associated frequencies into a single data point with an associated frequency that is the sum of the frequencies associated with the data points). In some embodiments, the empirical distribution function is used to group similar values together into a fixed number of bins. In some embodiments, the empirical distribution function is used to combine one or more sets of ordered lists to create a new ordered list of a fixed size. For example, ordered lists are combined to make a single ordered list with a fixed number of bins (e.g., 10,000 bins), and the value within the bins is calculated from each of the ordered lists being combined using the empirical distribution function to determine which values to associate with which bin. In some embodiments, the empirical distribution function is used on the values that fall outside of the preferred accuracy range. For example, in one use case the system parses data into 100 bins total and within the bins 0-50 the numbers are 100% accurate, but for the remaining bins the empirical distribution function is used to determine ranges of values associated with each of the bins. In another example use case, response times are determined in the millisecond range and are binned to determine their distribution—for example, a histogram is determined for the response times by binning the response times with a millisecond bin (e.g., 120,000 bins) for each response time of less than 2 minutes and a fixed set of bins for the remaining response times (e.g., for those response times greater than 2 minutes use 30,000 bins). In some embodiments, the data is sorted after conversion to a histogram. The data is sorted after similar values are grouped. An index value is determined by multiplying the desired percentile fraction (e.g., the percentile value divided by 100, e.g., 0.95 for $95^{th}$ percentile) by the number of data points (e.g., the index value corresponding to the $95^{th}$ percentile for a data set comprising 12953 points is 12953*0.95=12305.35). The percentile value is determined by counting through a number of points in the data set equal to the index value. Frequency values associated with the sorted data points are summed starting from the smallest valued data point until the index value is reached. In some embodiments, in the event the index value falls between two data points with different values, linear interpolation is used to find a final value.

In some embodiments, a system for determining percentiles for performance data comprises an interface configured to receive a request to determine a percentile value for a performance data. The interface also comprises a user interface for specifying a performance data set or subset for analysis. In various embodiments, the user interface allows a user to specify a process or set of processes for analysis, a date or date range for analysis, a time or time range for analysis, a user or group of users for analysis, or any other appropriate data set or subset for analysis. In some embodiments, the system for determining percentiles for performance data displays a data histogram associated with the data set or subset chosen for analysis. The system for determining percentiles for performance data determines a percentile value using an efficient algorithm and displays the percentile value. In some embodiments, the system for determining percentiles for performance data allows a user to recompute the histogram display and percentile calculation on new data sets and/or subsets as often as desired.

In some embodiments, the system indicates a performance data that is above a percentile threshold (e.g., a process performance data above a threshold—for example, a process is flagged in the event that its runtime is above 95%). In various embodiments, a process meeting a percentile criterion is suspended (e.g., halted and stored associated with metadata to restart the process in its appropriate state, partial results stored and information stored to be able to resubmit remaining operations of process) or terminated, or any other appropriate action.

In some embodiments, the results are used to detect anomalies and/or signatures. In some embodiments, the results are compared to similar results (e.g., those associated with a similar process—for example, an outcome of a process resulting from executing a similar function/command/etc.). In various embodiments, results are compared to the processes run by the same tenant, similar tenants, historic data, historic tenant data, other tenant data, all tenant data, or any other appropriate data. For example, a transaction process associated with the execution of entering a specific process (e.g., a time card process) is compared to other processes that are similar to determine whether the results are anomalous or not anomalous (e.g., explainable due to some systematic reason—for example, associated with more calculations such as a longer execution time of the process because it is associated with more calculations (e.g., a longer time period for time card entries)). In some embodiments, the results are automatically evaluated regarding the performance (e.g., compared to thresholds, compared to historic performance metrics like averages, percentiles, etc., compared to other tenant performance, etc.). In various embodiments, results are flagged. In some embodiments, processes associated with results are throttled (e.g., in the event that processes are taking all of the central processor time, other processes or similar processes are not allowed to be submitted). In some embodiments, the throttling includes informing a user that the system is busy and cannot handle the job. In some embodiments, performance is evaluated with respect to code changes.

FIG. 1 is a block diagram illustrating an embodiment of a network system comprising an application server and a data storage system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, application server(s) 104, data storage system 106, and performance monitor 108 communicate via network 100. User system 102 comprises a user system for use by a user. In various embodiments, user system 102 comprises a system for executing applications, processing data, displaying data, displaying images, displaying video, communicating with one or more server systems, requesting execution of an application from application server(s) 104, requesting a data analysis from application server(s) 104, or performing any other appropriate user system action. Application server(s) 104 comprise one or more an application servers for executing applications. In various embodiments, application server(s) 104 comprise application server(s) for analyzing data, for determining percentiles, for receiving a request for a data analysis from user system 102, for requesting data from data storage system 106, or for performing any other appropriate application server action. In various embodiments, application server(s) 104 comprise 1, 2, 4, 5, 9, 22, 91, or any other appropriate number of application servers. In some embodiments, application server(s) 104 comprise server(s) of a cluster system. In some embodiments, application server(s) 104 comprise server(s) provided by a cloud computing service. Data storage system 106 comprises a data storage system for storing data. In various embodiments, data storage system 106 comprises a data storage system for storing user data, network data, system data, or any other appropriate data. Data storage system 106 provides data to application server 104. Performance monitor 108 comprises a performance monitor for monitoring system performance (e.g., performance of application server(s) 104). In various embodiments, performance monitor 108 monitors performance of network 100, processes executed by application server(s) 104, processes requested by user system 102, or any other appropriate system or action. Performance monitor 108 stores performance monitoring data using data storage 106. In some embodiments, performance monitor 108 is implemented using an application server of application server(s) 104. In some embodiments, a user of user system 102 is associated with a tenant of a set of tenants. A tenant comprises an application server system customer, e.g., an organization, a business, a government, a university, etc. Tenant data is stored on application server(s) 104 and on data storage system 106. A process being executed by application server(s) 104 is associated with a tenant. In some embodiments, tenants are segregated (e.g., a user associated with a tenant of a set of tenants is not able to access processes and/or data associated with a different tenant of the set of tenants). In some embodiments, the user of user system 102 is interacting with a performance monitoring system.

Figure 2:
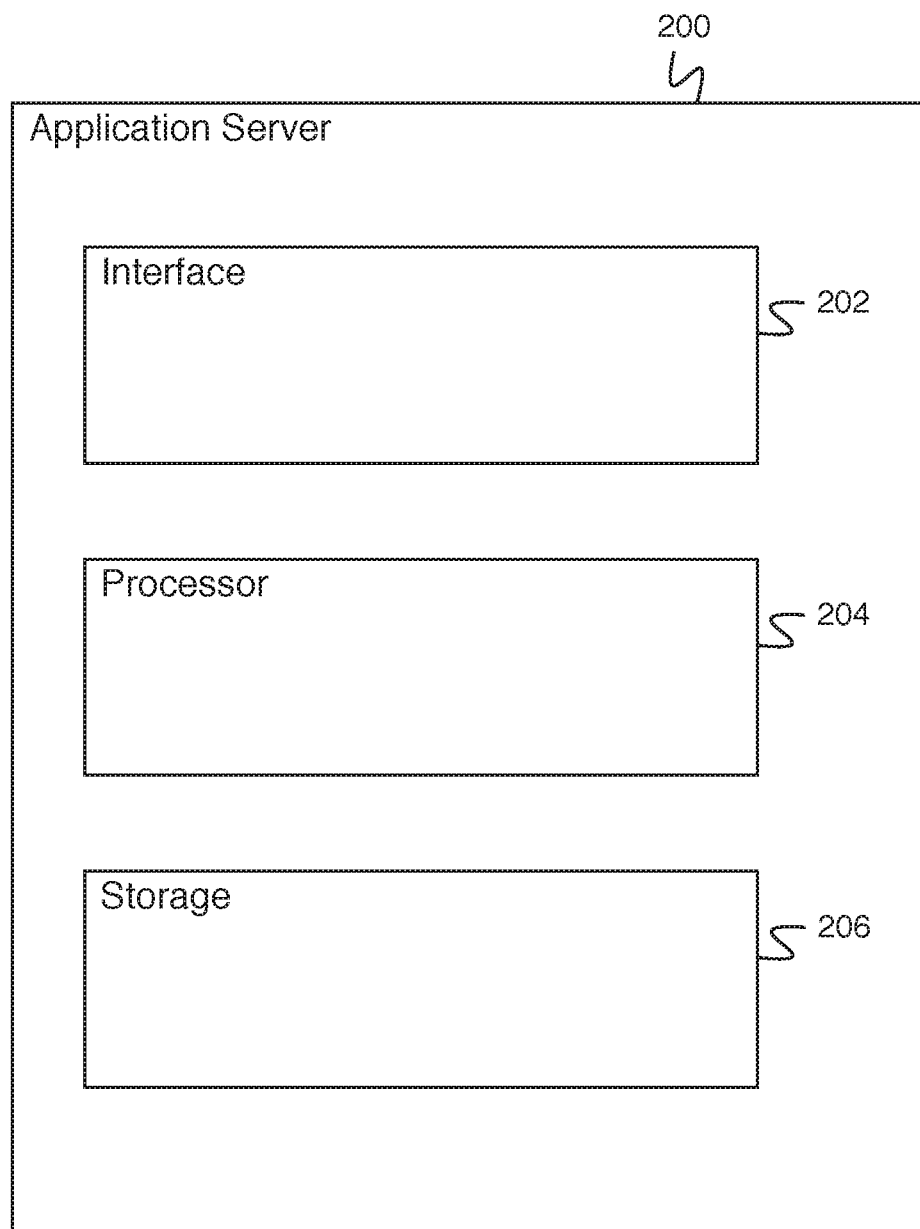
FIG. 2 is a block diagram illustrating an embodiment of an application server.

FIG. 2 is a block diagram illustrating an embodiment of an application server. In some embodiments, application server 200 comprises an application server of application server(s) 104 of FIG. 1. In the example shown, application server 200 comprises interface 202, processor 204, and storage 206. Interface 200 comprises a system for communicating with a network and via the network with another system (e.g., a user system, an administrator system, a server system, a data storage system, etc.). In various embodiments, interface 202 is also for receiving stored data, for receiving data requests, for receiving data processing requests, for receiving a process definition, for receiving process results, or for receiving any other appropriate information. In various embodiments, interface 202 is also for providing database data, for providing a request to ingest data, for providing a process definition, for providing an indication to execute a process, for providing a request for process results, for providing a data analysis, or for providing any other appropriate information. Processor 204 comprises a processor for processing data. In some embodiments, processor 204 comprises a processor for executing data processing tasks. Storage 206 comprises a storage for storing data. In various embodiments, storage 206 comprises a storage for storing performance data, for storing user data, for storing network data, for storing system data, for storing analysis results, for storing software instructions, or for storing any other appropriate data.

Figure 3:
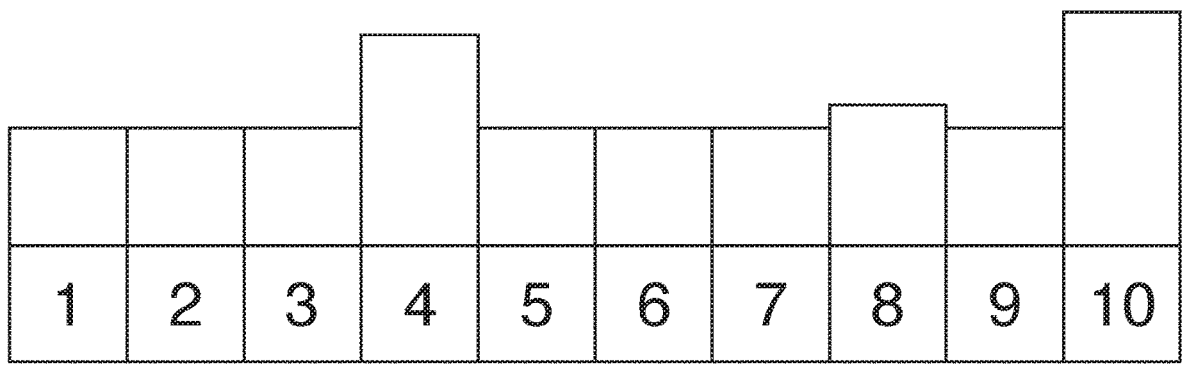
FIG. 3 is a diagram illustrating an embodiment of a user interface for a system for determining percentiles.

FIG. 3 is a diagram illustrating an embodiment of a user interface for a system for determining percentiles. In some embodiments, a user uses user system 102 of FIG. 1 to interact with the user interface of FIG. 3. In some embodiments, the user interface of FIG. 3 is provided by application server 104 of FIG. 1. In the example shown, the user system of FIG. 3 comprises a data set, an associated histogram, and a user interface panel. In some embodiments, when a new data point is received (e.g., by the system providing the user interface of FIG. 3), the data point is added to the displayed data set, and the associated histogram is updated. In the example shown, the data set comprises 50 data points. In the example shown, the user interface panel comprises a user interface panel for receiving user input. A user inputs a value for a percentile to calculate within the raw data. The system for determining percentiles determines the percentile requested from the data set and displays the result. In the example shown, the $35^{th}$ percentile is requested from the data set. The calculated and displayed value is 4.

Figure 4A:
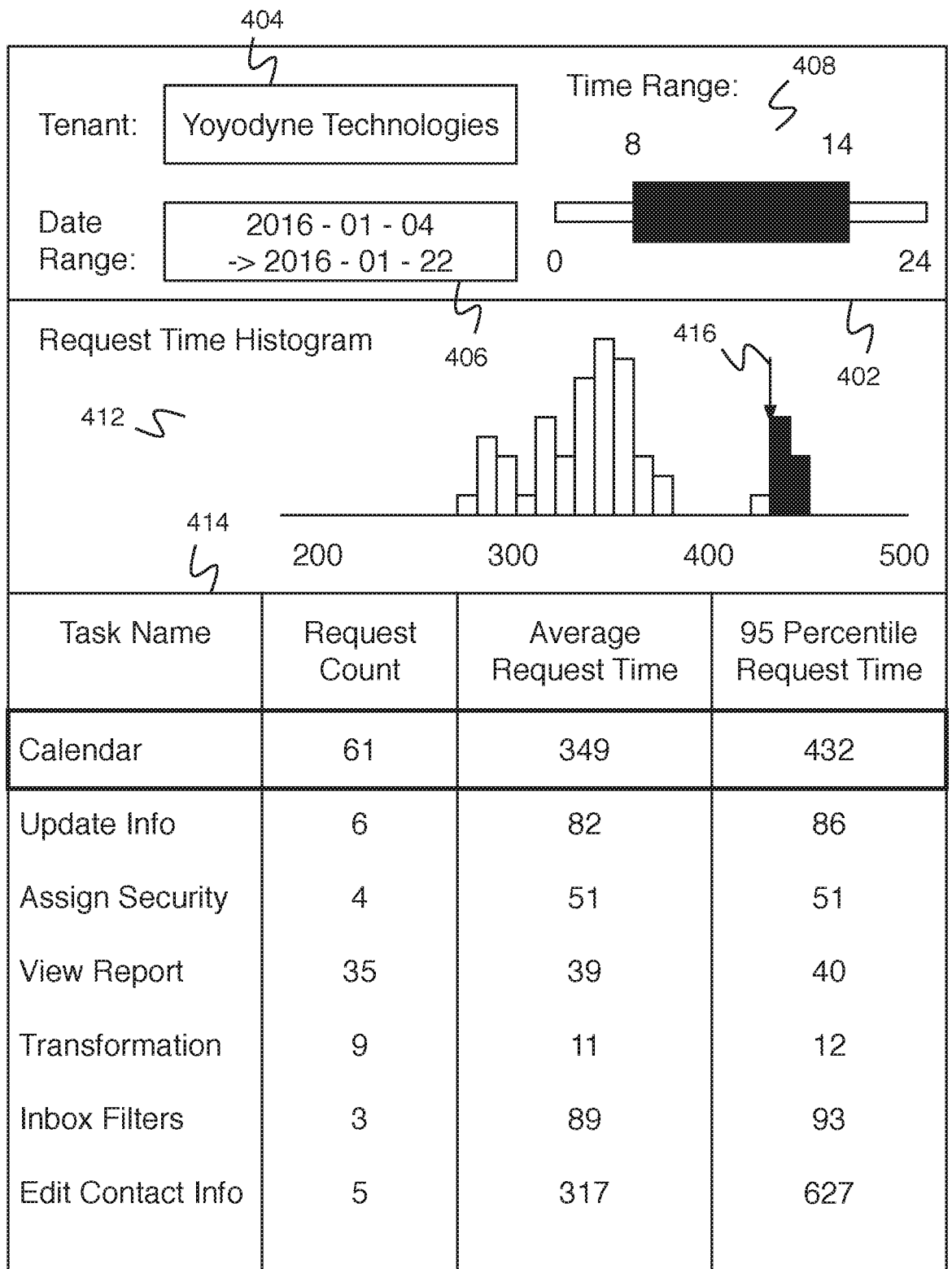
FIG. 4A is a diagram illustrating an embodiment of a user interface for a system for determining percentiles for performance data.

FIG. 4A is a diagram illustrating an embodiment of a user interface for a system for determining percentiles for performance data. In some embodiments, a user uses user system 102 of FIG. 1 to interact with user interface 400. In some embodiments, user interface 400 is provided by an application server of application server(s) 104 of FIG. 1. In the example shown, user interface 400 comprises data selection panel 402, comprising tenant selector 404, date range selector 406, and time range selector 408. Tenant selector 404 comprises a selector for selecting a tenant (e.g., an individual or organization user of the application server) for which data should be analyzed. In various embodiments, a user can select one tenant, two tenants, a group of tenants, all tenants, or any other appropriate set of tenants using tenant selector 404. Date range selector 406 comprises a date range selector for selecting a date range for performing data analysis. Time range selector 408 comprises a time range selector for selecting a time range for performing data analysis. Request time histogram 412 comprises a data histogram of request times for a selected task. Task chart and selector 414 comprises a chart of tasks (e.g., tasks associated with the tenant indicated by tenant selector 404) and associated data. Task chart and selector 414 additionally allows a user to select a task for data display by data histogram 412. In the example shown, task chart and selector 414 displays a request count, an average request time, and a 95th percentile request time for each of a set of tasks. In some embodiments, task chart and selector 414 displays performance data. In various embodiments, task chart and selector 414 displays request count data, request time data, network activity data, active request data, user data, or any other appropriate performance data. In the example shown, data histogram 412 comprises $95^{th}$ percentile arrow 416. $95^{th}$ percentile arrow 416 indicates the $95^{th}$ percentile value on histogram 412 for identification of outlier data points. In the example shown, data points above the $95^{th}$ percentile value are colored differently (e.g., filled in solid black) for easy identification as outliers. In various embodiments, an indication of outlier values comprises an arrow, a coloration, a highlighting, a shading, or any other appropriate indication.

Figure 4B:
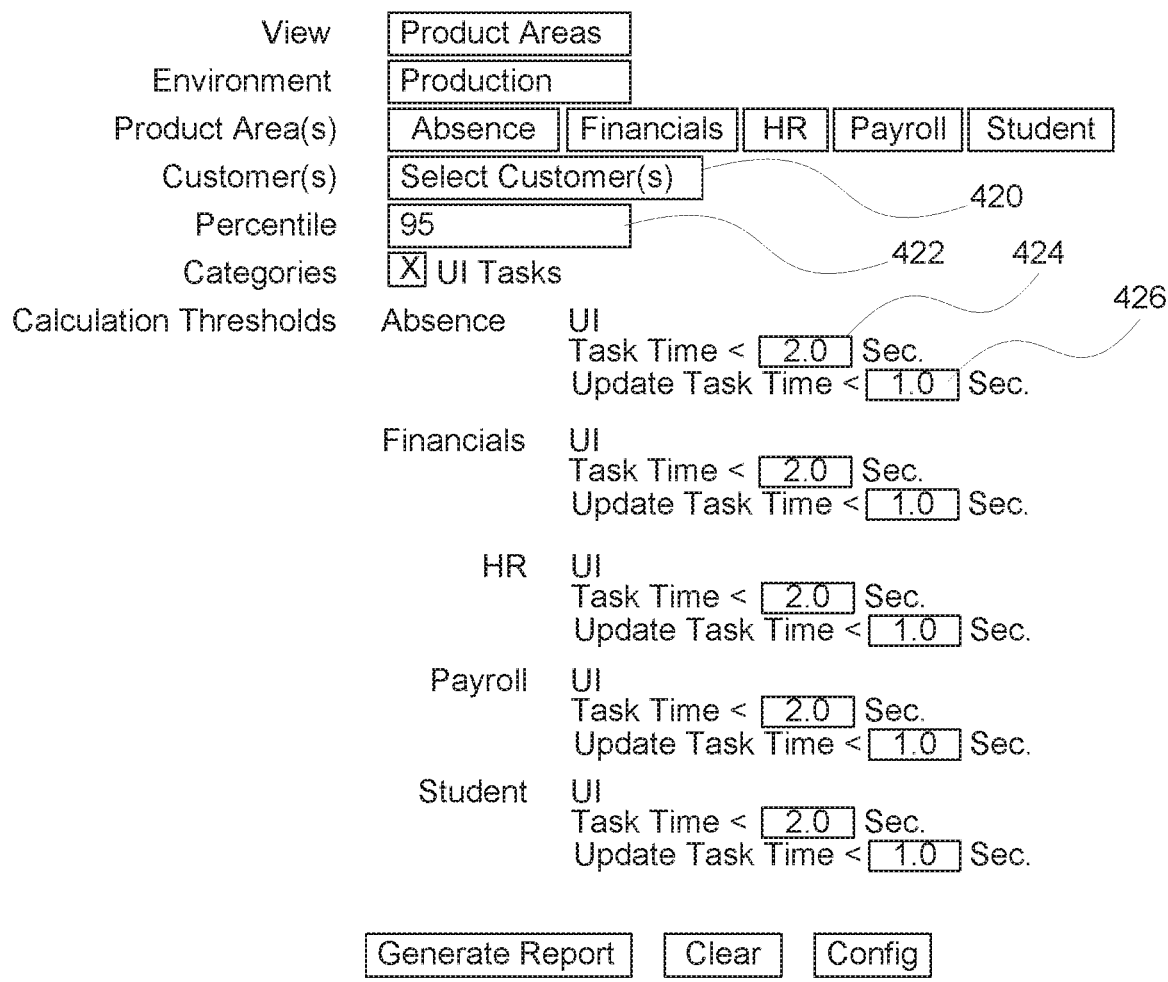
FIG. 4B is a diagram illustrating an embodiment of a user interface for configuring a performance monitoring system.

FIG. 4B is a diagram illustrating an embodiment of a user interface for configuring a performance monitoring system. In some embodiments, the interface of FIG. 4B is used to configure performance monitor 108 of FIG. 1. In the example shown, configuration settings are selected for a performance monitor functionality. For example, a user is enabled to select a view, an environment, one or more product areas, one or more customers (e.g., using select customer(s) window 420), a percentile threshold (e.g., using percentile threshold window 422), category selection, and calculation thresholds—for example, a task time threshold (e.g., using absence UI task time threshold window 424), an update task time threshold (e.g., using absence UI update task time threshold window 426), etc. The user is also enabled to indicate to generate a report, clear the interface, or configure the interface using buttons.

Figure 4C:
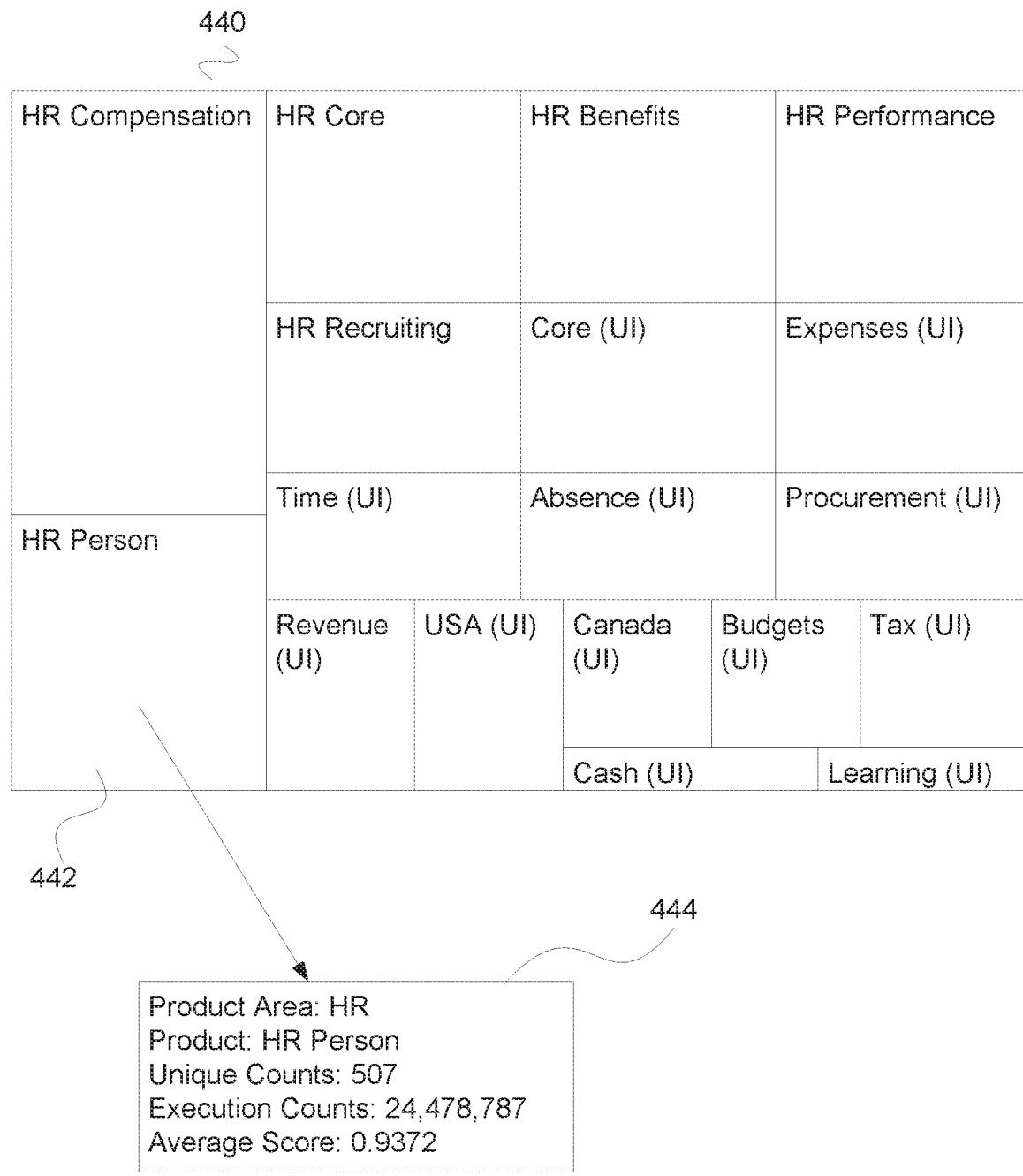
FIG. 4C is a diagram illustrating an embodiment of a user interface for displaying performance monitoring system output.

FIG. 4C is a diagram illustrating an embodiment of a user interface for displaying performance monitoring system output. In some embodiments, the interface of FIG. 4C is used to provide performance monitor output to a user. In the example shown, user interface (UI) for output 440 displays a rectangle associated with different tasks/processes performed by the system being monitored. In some embodiments, the rectangles are colored associated with a range of the determined performance statistic (e.g., average score or percentile associated with a task time). In some embodiments, a color mapping index is shown in the user interface display. Pop out display 444 shows details associated with a given task/process (e.g., HR Person). Pop out display 444 shows product area (e.g., HR), product (e.g., HR Person), unique counts (e.g., number of tasks that meet the threshold—for example, 507), execution counts (e.g., total number of tasks that were executed—for example, 24,478,787), and average score (e.g., percentile associated with the performance output—for example, 0.9372).

Figure 5:
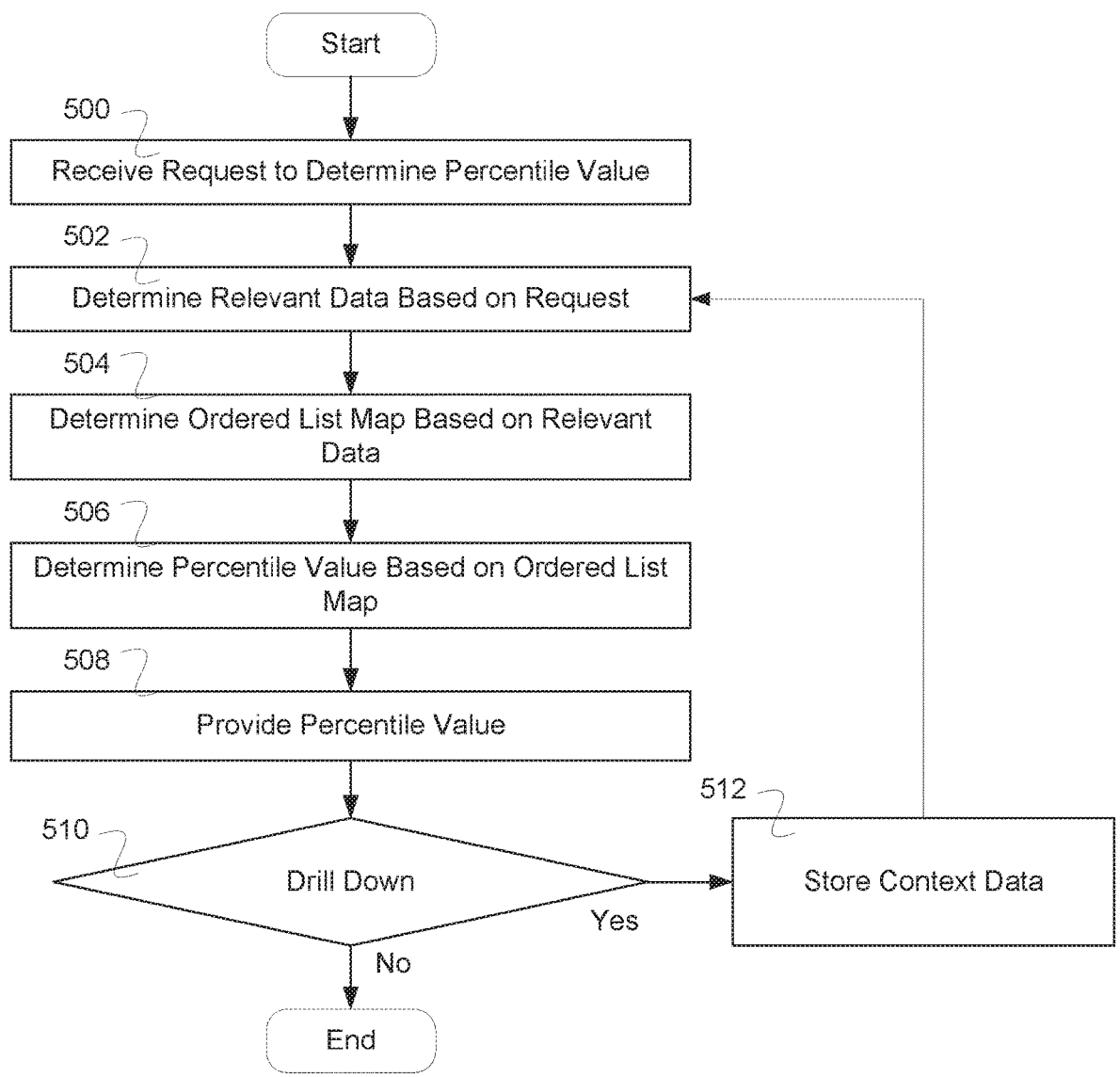
FIG. 5 is a flow diagram illustrating an embodiment of a process for determining percentiles.

FIG. 5 is a flow diagram illustrating an embodiment of a process for determining percentiles. In some embodiments, the process of FIG. 5 comprises a process for determining percentiles for performance data. In some embodiments, the process of FIG. 5 is executed by an application server of application server(s) 104 of FIG. 1. In the example shown, in 500, a request to determine a percentile value is received. In some embodiments, the request comprises a request to determine a percentile value for a performance data. In various embodiments, the performance data comprises request count data, request time data, network activity data, active request data, user data, or any other appropriate performance data. In 502, relevant data is determined based at least in part on the request. In various embodiments, relevant data comprises data associated with a tenant, data associated with a task, data associated with a time period, or any other appropriate relevant data. In some embodiments, data comprises raw data. In some embodiments, data comprises one or more precomputed ordered list maps. In 504, an ordered list map is determined based at least in part on the relevant data (e.g., by creating a list map from raw data, by merging ordered list maps, etc.). In 506, the percentile value is determined based at least in part on the ordered list map. For example, the percentile value is determined by walking the ordered list map until an index value is reached. In some embodiments, the percentile value is determined based at least in part on a broadened ordered list map determined from the ordered list map. In 508, the percentile value is provided. In some embodiments, the percentile value for the performance data is provided. In some embodiments, the percentile value is provided for display. In 510, it is determined whether to drill down into the relevant data. In some embodiments, drilling down into the relevant data comprises recomputing a percentile value based at least in part on a subset of the relevant data (e.g., using a narrower time and/or date range, using a specific tenant, using a specific task, etc.). In various embodiments, determining whether to drill down into the relevant data comprises querying a user for a drill down command, checking a drill down criteria, determining whether data indicates to drill down, or determining whether to drill down in any other appropriate way. In the event it is determined in 510 not to drill down, the process ends. In the event it is determined in 510 to drill down, in 512 context data is stored and control passes to 502. For example, information is stored that keeps track of contextual data including one or more of the following: previous percentile value calculations, ranges of data used for percentile calculation, value minima and maxima, etc. In some embodiments, relevant data determined in 502 comprises a subset of relevant data determined in a previous iteration of 502. In some embodiments, relevant data determined in 502 comprises data not determined in a previous iteration of 502 (e.g., raw data not previously determined, one or more precomputed list maps not determined in a previous iteration of 502, etc.).

Figure 6:
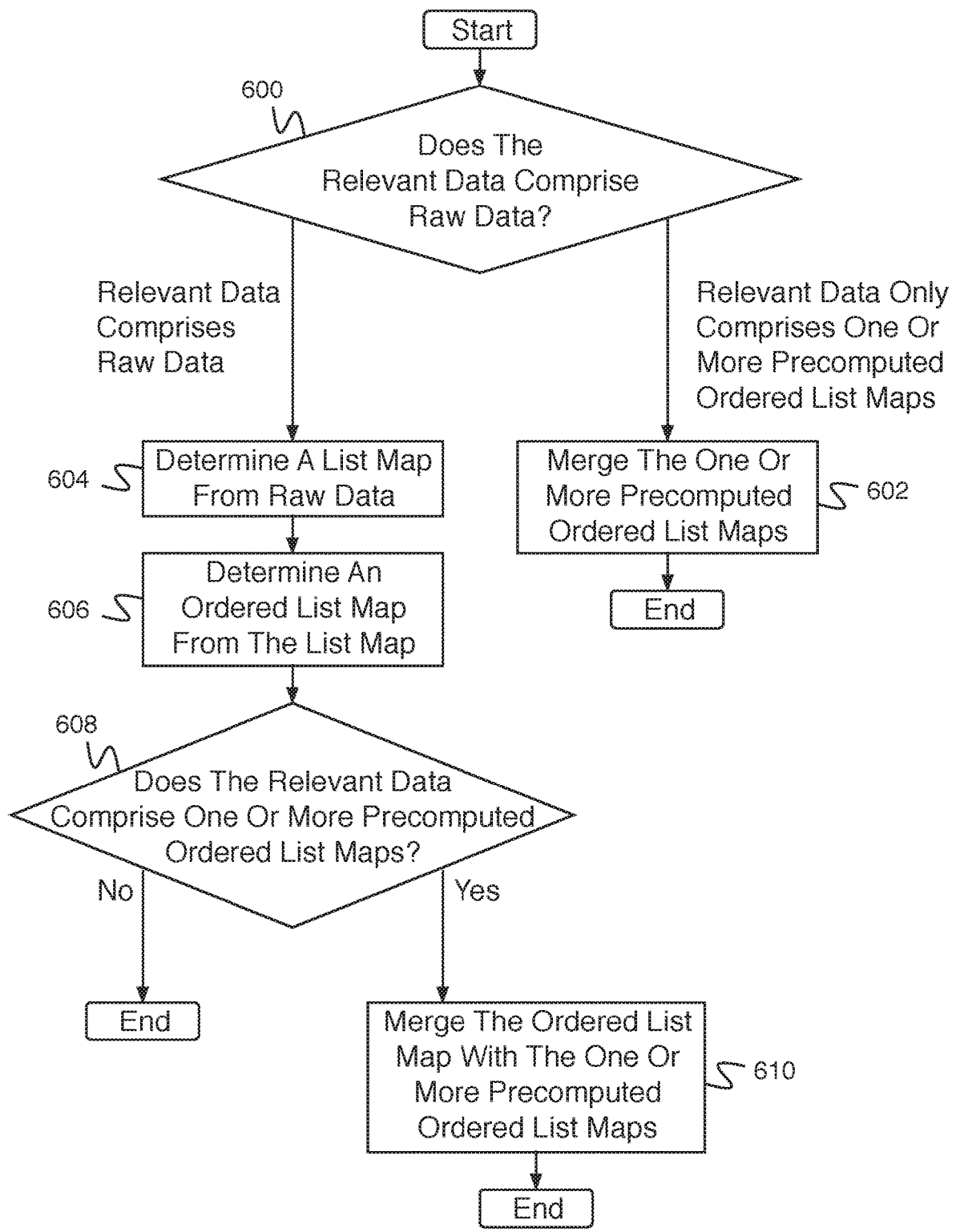
FIG. 6 is a flow diagram illustrating an embodiment of a process for determining an ordered list map based at least in part on relevant data.

FIG. 6 is a flow diagram illustrating an embodiment of a process for determining an ordered list map based at least in part on relevant data. In some embodiments, the process of FIG. 6 implements 504 of FIG. 5. In the example shown, in 600, it is determined whether the relevant data comprises raw data. In some embodiments, the relevant data can comprise raw data, one or more precomputed ordered list maps, or raw data and one or more precomputed ordered list maps. In the event it is determined that the relevant data only comprises one or more precomputed ordered list maps (e.g., and no raw data), control passes to 602. In 602, the one or more precomputed ordered list maps are merged, and the process ends. In the event it is determined in 600 that the relevant data comprises raw data, control passes to 604. In 604, a list map is determined from the raw data. For example, a list map comprises a set of pairs of values and associated frequencies, each frequency indicating how many times the associated value appears in the raw data. In 606, an ordered list map is determined from the list map. In some embodiments, determining an ordered list map from the list map comprises sorting the list map by the value elements of the pairs. In 608, it is determined whether the relevant data comprises one or more precomputed ordered list maps. In the event it is determined that the relevant data does not comprise one or more precomputed ordered list maps (e.g., the relevant data only comprises raw data), the process ends. In the event it is determined in 608 that the relevant data comprises one or more precomputed ordered list maps, control passes to 610. In 610, the ordered list map (e.g., the ordered list map determined in 606) is merged with the one or more precomputed ordered list maps. In some embodiments, as part of the merging of the ordered list map with the one or more precomputed ordered list maps, binning is redetermined. In various embodiments, all bins are redetermined or a subset of bins are redetermined (e.g., bins outside of a preferred accuracy range). In some embodiments, the empirical distribution function is applied to all bins to redetermine values in the bins. In some embodiments, the empirical distribution function is applied to a subset of bins to redetermine values in the subset of bins (e.g., bins outside of a preferred accuracy range).

Figure 7:
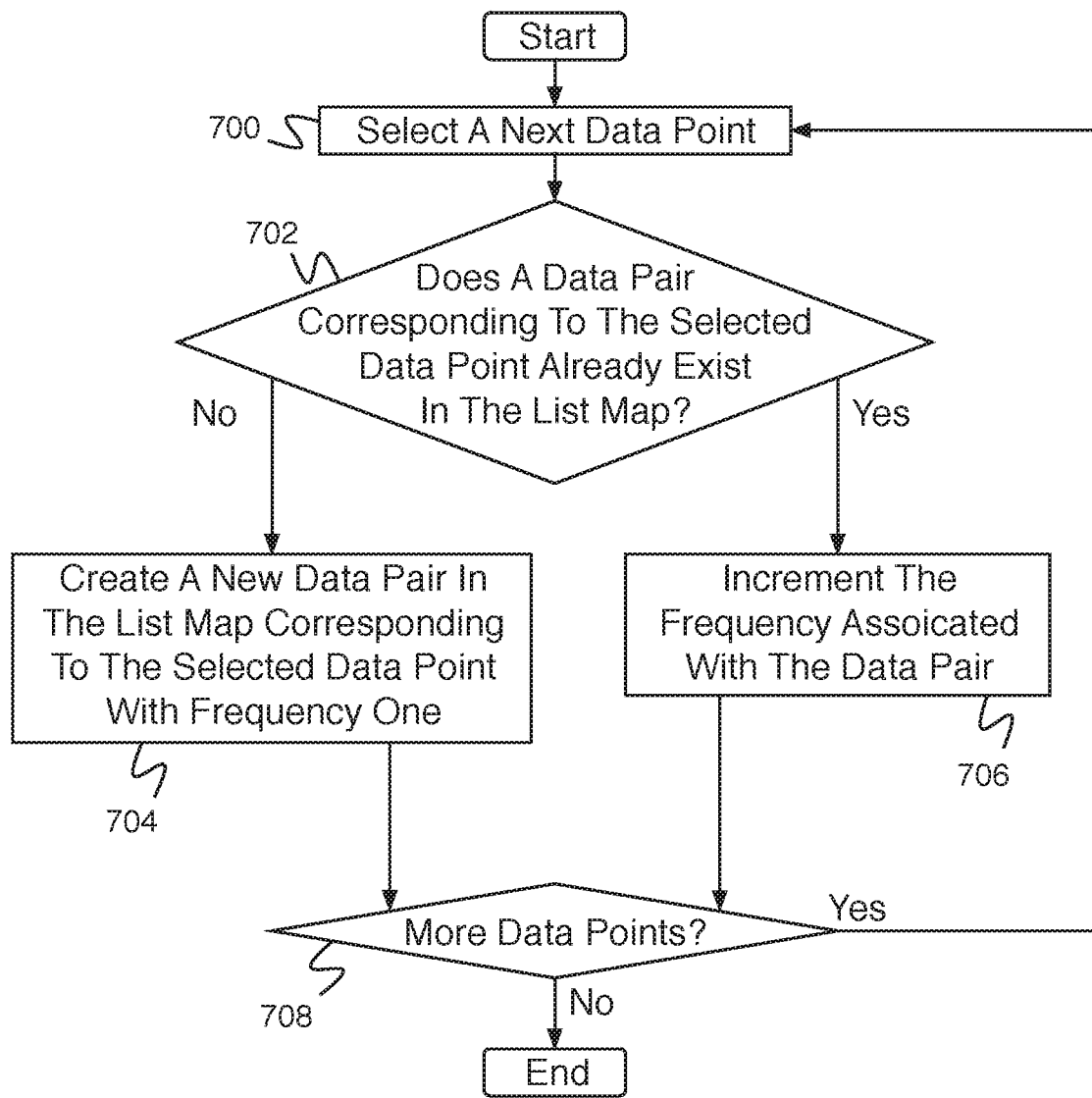
FIG. 7 is a flow diagram illustrating an embodiment of a process for determining a list map from raw data.

FIG. 7 is a flow diagram illustrating an embodiment of a process for determining a list map from raw data. In some embodiments, the process of FIG. 7 implements 604 of FIG. 6. In the example shown, in 700, a next data point is selected. In some embodiments, the next data point comprises the first data point. In 702, it is determined whether a data pair corresponding to the selected data point already exists in the list map. In the event it is determined that a data pair corresponding to the selected data point already exists in the list map, control passes to 706. In 706, the frequency associated with the data pair is incremented. Control then passes to 708. In the event it is determined in 702 that a data pair corresponding to the selected data point does not already exist in the list map, control passes to 704. In 704, a new data pair is created in the list map corresponding to the selected data point and with frequency one. Control then passes to 708. In 708, it is determined whether there are more data points (e.g., in the raw data). In the event it is determined that there are more data points, control passes to 700. In the event it is determined that there are not more data points, the process ends.

Figure 8:
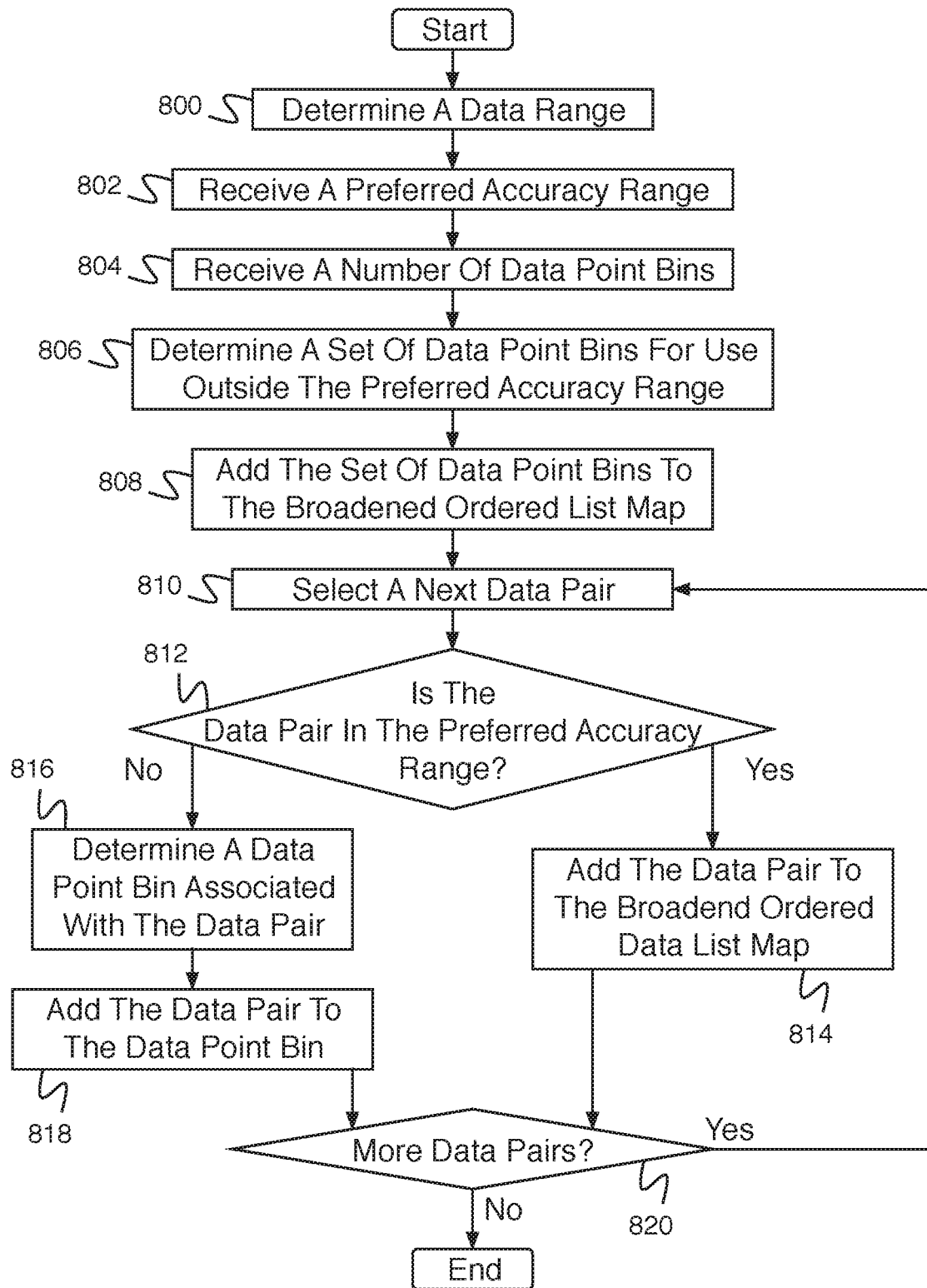
FIG. 8 is a flow diagram illustrating an embodiment of a process for determining a broadened ordered data list map based at least in part on an ordered data list map.

FIG. 8 is a flow diagram illustrating an embodiment of a process for determining a broadened ordered data list map based at least in part on an ordered data list map. In some embodiments, a broadened ordered data list map comprises a set of data point bins, each data point bin comprising a data range (e.g., a data start value and a data stop value) and a data frequency indicating the number of data points falling within the data range. In some embodiments, the ordered list map comprises an ordered list map determined in 504 of FIG. 5. In the example shown, in 800, a data range is determined. In some embodiments, the data range comprises the distance between the smallest data value and the largest data value. In 802, a preferred accuracy range is received. In some embodiments, a preferred accuracy range comprises a data range within which the data point bins are not broadened. In 804, a number of data point bins is received. In some embodiments, a number of data point bins comprises a total number of data point bins to be used in the broadened ordered data list map. In 806, a set of data point bins for use outside the preferred accuracy range is determined. In some embodiments, determining the set of data point bins for use outside the preferred accuracy range comprises determining a data point bin size. In some embodiments, a data point bin size comprises the quotient of the broadened data range and the number of broadened data point bins. In some embodiments, the broadened data range comprises the data range minus the preferred accuracy range. In some embodiments, the number of broadened data point bins comprises the number of data point bins minus the number of data pairs (e.g., data pairs of the ordered data list map) within the preferred accuracy range. In some embodiments, in the event the number of data pairs within the preferred accuracy range is greater than the number of data point bins, creation of the broadened ordered list map according to specifications is not possible, and an error is reported. In some embodiments, the data point bins are placed contiguously (e.g., the data stop value of a first data point bin comprises a data start value of a next data point bin) within the data range outside of the preferred accuracy range, each data point bin the determined data point bin size. In 808, the set of data point bins (e.g., determined in 806) is added to the broadened ordered list map. In 810, a next data pair (e.g., of the ordered data list map) is selected. In some embodiments, the next data pair comprises the first data pair. In 812, it is determined whether the data pair is in the preferred accuracy range. In the event it is determined that the data pair is in the preferred accuracy range, control passes to 814. In 814, the data pair is added to the broadened ordered data list map (e.g., without loss of resolution by grouping the data point within a data point bin). Control then passes to 820. In the event it is determined in 812 that the data pair is not in the preferred accuracy range, control passes to 816. In 816, a data point bin associated with the data pair is determined. In some embodiments, the data point bin determined to be associated with the data pair comprises the data point bin for which the value associated with the data pair falls within the data range associated with the data point bin. In 818, the data pair is added to the data point bin. In some embodiments, adding the data pair to the data point bin comprises increasing the frequency associated with the data point bin by the frequency associated with the data pair. Control then passes to 820. In 820, it is determined whether there are more data pairs. In the event it is determined that there are more data pairs, control passes to 810. In the event it is determined that there are not more data pairs, the process ends.

Figure 9:
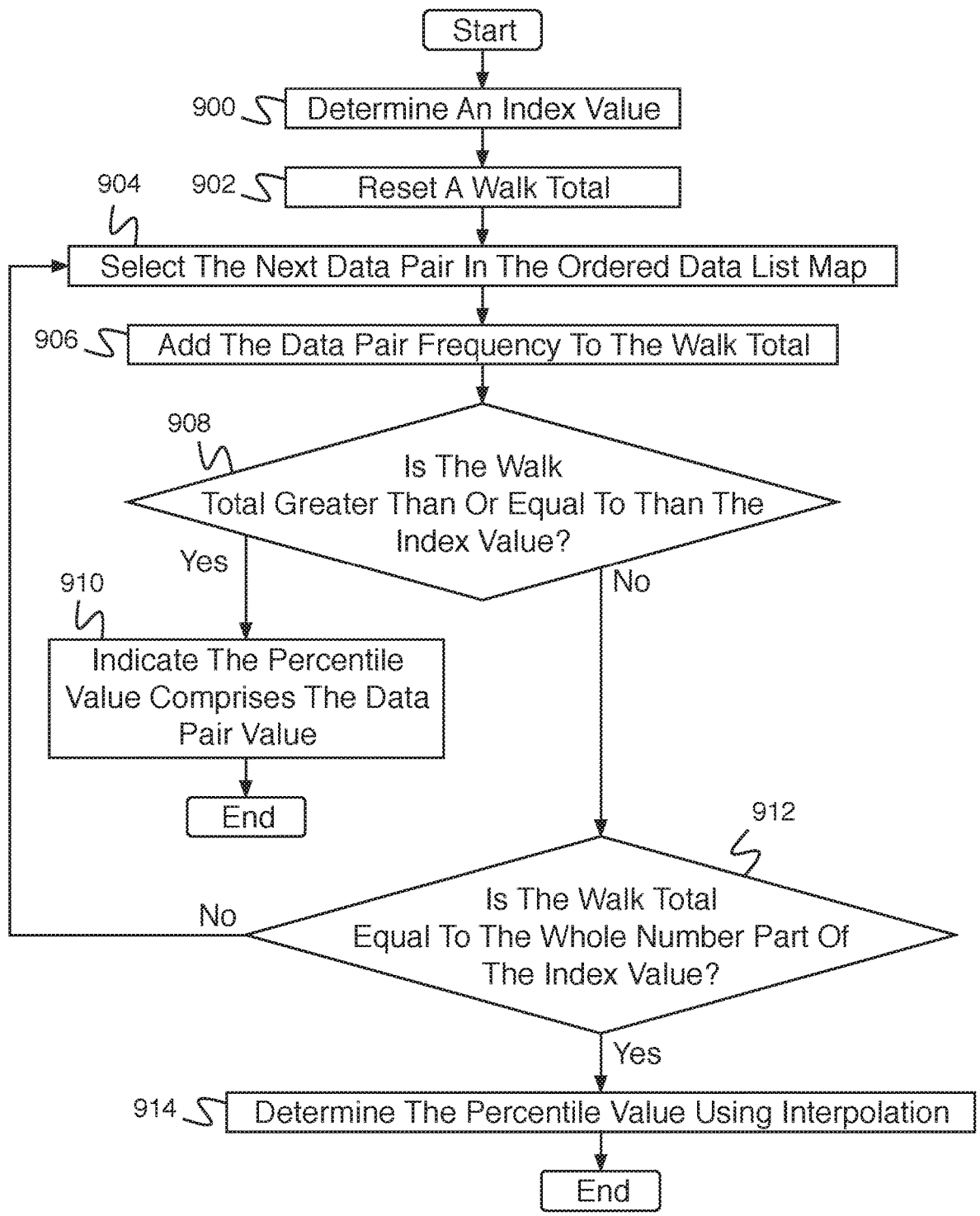
FIG. 9 is a flow diagram illustrating an embodiment of a process for determining a percentile value.

FIG. 9 is a flow diagram illustrating an embodiment of a process for determining a percentile value. In some embodiments, the process of FIG. 9 implements 506 of FIG. 5. In some embodiments, the process of FIG. 9 determines a percentile value based at least in part on an ordered list map or a broadened ordered list map. In the example shown, in 900, an index value is determined. In some embodiments, an index value comprises a data index within the data set that is to be determined to determine the percentile value. For example, when calculating the 95$^{th}$ percentile within a data set that contains 200 values, the index value is determined to be 190—to calculate the 95$^{th}$ percentile value, the 190$^{th}$ value in the ordered set of 200 values is located. In some embodiments, the index value is determining by multiplying the fractional percentile value (e.g., the percentile value divided by 100—for the 95$^{th}$ percentile, the fractional percentile value comprises 0.95) by the number of data points in the data set. In 902, a walk total is reset (e.g., set to zero). In 904, the next data pair in the ordered data list map is selected. In some embodiments, the next data pair comprises the first data pair. In 906, the data pair frequency is added to the walk total. In 908, it is determined whether the walk total is greater than or equal to the index value. In the event it is determined that the walk total is greater than or equal to the index value, control passes to 910. In 910, it is indicated that the percentile value comprises the data pair value, and the process ends. In the event it is determined in 908 that the walk total is not greater than or equal to the index value, control passes to 912. In 912, it is determined whether the walk total is equal to the whole number part of the index value. In some embodiments, the index value is not an integer (e.g., in the event the data set comprises 50 values and the 55$^{th}$ percentile value is desired, the index value is equal to 27.5). In the event the walk total is equal to the whole number part of the index value (e.g., the index value rounded down), control passes to 914. In the event the walk total is not equal to the whole number part of the index value, control passes to 904. In 914, the percentile value is determined using interpolation.

Figure 10:
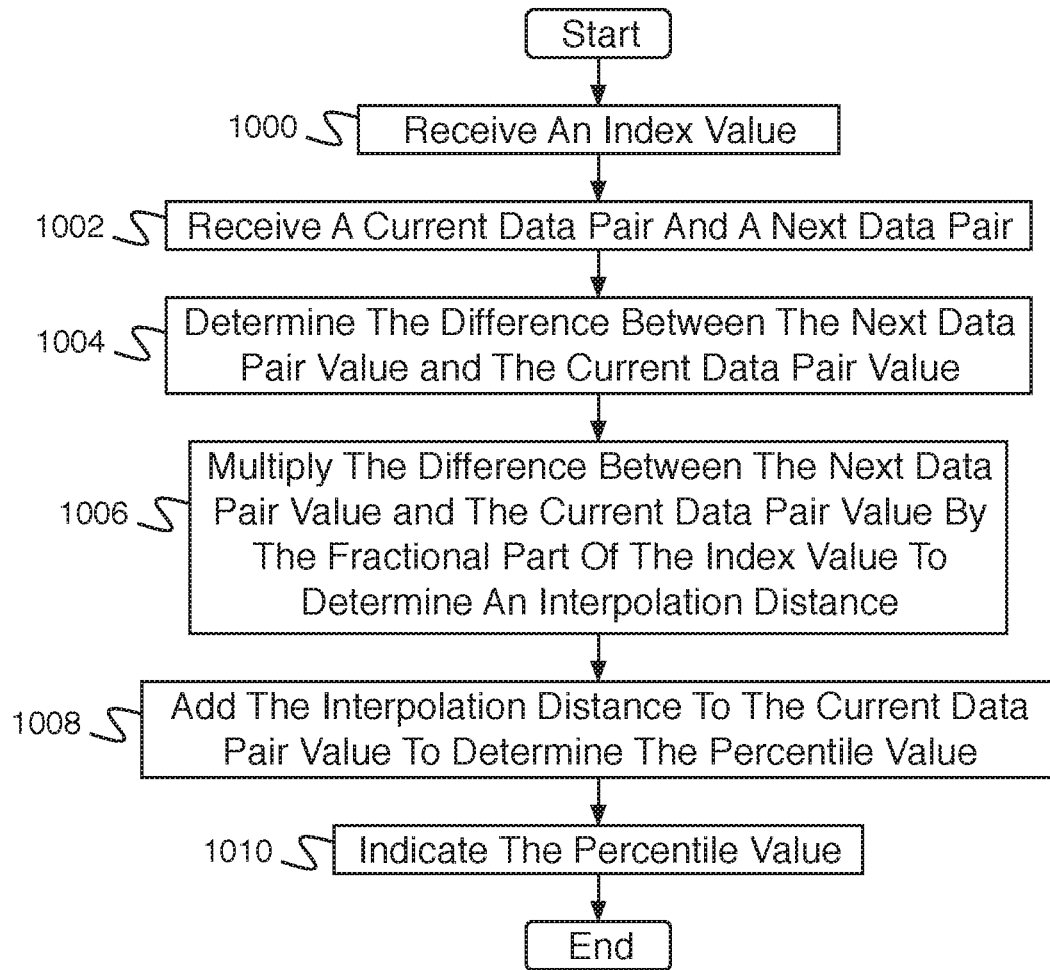
FIG. 10 is a flow diagram illustrating an embodiment of a process for determining a percentile value using interpolation.

FIG. 10 is a flow diagram illustrating an embodiment of a process for determining a percentile value using interpolation. In some embodiments, the process of FIG. 10 implements 914 of FIG. 9. In the example shown, in 1000, an index value is received. In some embodiments, the index value comprises the index value determined in 900 of FIG. 9. In 1002, a current data pair and a next data pair are received. In some embodiments, the current data pair comprises the data pair most recently added to a walk total before it was determined that the walk total is equal to the whole number part of the index value (e.g., in 912 of FIG. 9). In some embodiments, the next data pair comprises the next data pair within an ordered list map after the current data pair. In 1004, the difference between the next data pair value and the current data pair value is determined. In 1006, the difference between the next data pair value and the current data pair value is multiplied by the fractional part of the index value, to determine an interpolation distance. In 1008, the interpolation distance is added to the current data pair value to determine the percentile value. In 1010, the percentile value is provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for monitoring performance data, comprising:
    an interface configured to receive a request to determine a percentile value; and value for a percentile, wherein the percentile value is associated with a performance data; and
    a processor configured to:
        determine relevant data based at least in part on the request;
        determine an ordered data list map, wherein the ordered data list map comprises a set of pairs of values and associated frequencies corresponding to the relevant data;
        determine a broadened ordered data list map, comprising to:
            determine a data range associated with the ordered data list map, wherein the data range comprises a preferred accuracy range and a broadened data range outside of the preferred accuracy range;

add a set of data point bins to the broadened ordered data list map, wherein the set of data point bins are associated with sub-ranges of the broadened data range and sub-range frequencies; and in response to a determination that a value of a pair of the set of pairs is not in the preferred accuracy range, increase a sub-range frequency associated with a data point bin of the set of data point bins by a frequency associated with the pair, wherein the value associated with the pair is within the sub-range associated with the data point bin;

determine the percentile value based at least in part on the broadened ordered data list map;

provide the percentile value; and modify an operation of a process associated with the performance data in response to the percentile value meeting a percentile criterion.

2. The system of claim 1, wherein the processor is further configured to provide a request for the relevant data.

3. The system of claim 1, wherein the processor is further configured to receive the relevant data.

4. The system of claim 1, wherein the processor is further configured to determine a data list map based at least in part on the relevant data.

5. The system of claim 4, wherein determining a data list map comprises determining the set of pairs of values and associated frequencies corresponding to the relevant data.

6. The system of claim 4, wherein determining an ordered data list map comprises sorting the set of pairs of values and associated frequencies.

7. The system of claim 1, wherein determining a broadened ordered data list map comprises grouping two or more pairs of values and associated frequencies into a single pair of a value and associated frequency.

8. The system of claim 1, wherein determining a broadened ordered data list map comprises reducing a total number of pairs of values and associated frequencies to a predetermined number.

9. The system of claim 1, wherein a predetermined portion of the broadened ordered data list map is unchanged from the ordered list data map.

10. The system of claim 1, wherein the processor is configured to combine two or more precomputed ordered data list maps to determine the ordered data list map.

11. The system of claim 1, wherein the processor is configured to combine a precomputed ordered data list map with the ordered data list map.

12. The system of claim 1, wherein determining the percentile value comprises walking the ordered data list map.

13. The system of claim 12, wherein walking the ordered data list map comprises determining an index value and summing frequencies from the ordered data list map until the index value is reached.

14. The system of claim 12, wherein walking the ordered data list map comprises interpolating between values of the ordered data list map.

15. The system of claim 14, wherein interpolating between values of the ordered data list map comprises interpolating between neighboring values of the ordered data list map when an index value falls between neighboring values.

16. The system of claim 14, wherein interpolating comprises using linear interpolation.

17. The system of claim 1, wherein providing the percentile value comprises providing the percentile value for display.

18. A method for determining monitoring performance data, comprising:

receiving a request to determine a percentile value for a percentile, wherein the percentile value is associated with a performance data;

determining, using a processor, relevant data based at least in part on the request;

determining an ordered data list map, wherein the ordered data list map comprises a set of pairs of values and associated frequencies corresponding to the relevant data;

determining a broadened ordered data list map, comprising:

determining a data range associated with the ordered data list map, wherein the data range comprises a preferred accuracy range and a broadened data range outside of the preferred accuracy range;

adding a set of data point bins to the broadened ordered data list map, wherein the set of data point bins are associated with sub-ranges of the broadened data range and sub-range frequencies; and in response to a determination that a value of a pair of the set of pairs is not in the preferred accuracy range, increasing a sub-range frequency associated with a data point bin of the set of data point bins by a frequency associated with the pair, wherein the value associated with the pair is within the sub-range associated with the data point bin;

determining the percentile value based at least in part on the broadened ordered data list map;

providing the percentile value; and modifying an operation of a process associated with the performance data in response to the percentile value meeting a percentile criterion.

19. A computer program product for monitoring performance data, the computer program product being embodied in a non-transitory computer readable storage medium and comprising computer instructions for:

receiving a request to determine a percentile value for a percentile, wherein the percentile value is associated with a performance data;

determining relevant data based at least in part on the request;

determining an ordered data list map, wherein the ordered data list map comprises a set of pairs of values and associated frequencies corresponding to the relevant data;

determining a broadened ordered data list map, comprising:

determining a data range associated with the ordered data list map, wherein the data range comprises a preferred accuracy range and a broadened data range outside of the preferred accuracy range;

adding a set of data point bins to the broadened ordered data list map, wherein the set of data point bins are associated with sub-ranges of the broadened data range and sub-range frequencies; and in response to a determination that a value of a pair of the set of pairs is not in the preferred accuracy range, increasing a sub-range frequency associated with a data point bin of the set of data point bins by a frequency associated with the pair, wherein the value associated with the pair is within the sub-range associated with the data point bin;

determining the percentile value based at least in part on the broadened ordered data list map;

providing the percentile value; and modifying an operation of a process associated with the performance data in response to the percentile value meeting a percentile criterion.

20. The system of claim 1, wherein the processor is further configured to determine whether the value of the pair of the set of pairs is in the preferred accuracy range.

21. The system of claim 1, wherein in response to a determination that the value of the pair of the set of pairs is in the preferred accuracy range, add the pair to the broadened ordered data list map.

22. The system of claim 1, wherein the ordered data list map range is from a smallest value of the set of pairs to a largest value of the set of pairs.

* * * * *

UNITED STATES PATENT AND TRADEMARK OFFICE
CERTIFICATE OF CORRECTION

PATENT NO. : 10,909,177 B1
APPLICATION NO. : 15/408266
DATED : February 2, 2021
INVENTOR(S) : Don Rudish, Muthukumarappa Jayakumar and Patrick Kirby Page 1 of 1

It is certified that error appears in the above-identified patent and that said Letters Patent is hereby corrected as shown below:

On the Title Page

In page 2, Column 2, item (56), U.S. patent documents, cite no. 9, delete "Kuhhirte" and insert --Kuhhirte et al.--, therefor.

In the Claims

In Column 10, Line(s) 54, Claim 1, before "value for", delete "value; and".

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*